Jan. 3, 1933.                    H. D. GEYER                    1,892,943
                      VIBRATION ABSORBING CONNECTER
                           Filed Feb. 6, 1932

Inventor
HARVEY D. GEYER
By Spencer Hardman & Fehr
his Attorneys

Patented Jan. 3, 1933

1,892,943

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

VIBRATION-ABSORBING CONNECTER

Application filed February 6, 1932. Serial No. 591,438.

This invention relates to vibration-absorbing non-metallic connections between a support base and a member supported thereby, and is especially adapted for mounting various devices of an automobile upon the chassis frame.

It is well known that resilient rubber is a desirable material for isolating two rigid parts from each other to prevent the transmission therebetween of vibrations. It is also well known that the life and efficiency of such resilient rubber connections is materially increased by providing that the rubber material be under a certain degree of compression. In order to obtain the greatest efficiency and best results the degree of compression on the rubber must be quite precisely determined and in every case, when the units are assembled, the compression on the resilient rubber material should be precisely adjusted accordingly. Experience shows that the great difficulty in the use of resilient rubber connections on automobiles lies in the fact that the mechanic assembling the devices ordinarily has no means of determining just when the proper compression on the rubber is reached and he either clamps the rubber under too great compression or too little compression. In the one case the connection will be too rigid to properly absorb the vibrations and the rubber may be damaged by excessive bulging and cracking which will cause early failure. In the other case the connection will not be rigid enough to prevent the isolated metal parts from having too great relative movement and the metal parts may contact and destroy the non-metallic connection causing transmission of noises, rapid wear and rattling of the metal parts which contact, and early failure of the rubber material due to relative slipping of the metal parts thereupon or due to the general looseness of the rubber which permits oil, sand, mud, etc., to enter the crevices around the rubber and rapidly deteriorate the same.

Now the object of this invention is to provide a resilient rubber connection which when assembled inherently requires that the rubber material be compressed to a precisely predetermined amount to give the best results and without any concern as to such compression on the part of the mechanic doing the assembling. Thus all the above described ordinarily encountered defects are avoided and the time required and cost of assembling decreased.

Another object of the invention is to provide a very simple yet efficient form of resilient rubber connection which can be very economically made in large quantities, and which takes up little space, and which necessitates no particular design of the rigid metal parts connected thereby. In the form chosen for illustration the connected metal parts are merely two flat metal plates located closely adjacent one another and the only design required of them for the attachment of the connecter is a single hole cut in each.

A feature of this connection therefore is its adaptability for application in cramped locations and in places where the final exact location is not readily determined until the final assembling is made. For instance the small hole in the support may be easily drilled during assembling to correspond to the desired position of the supported member.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 1:
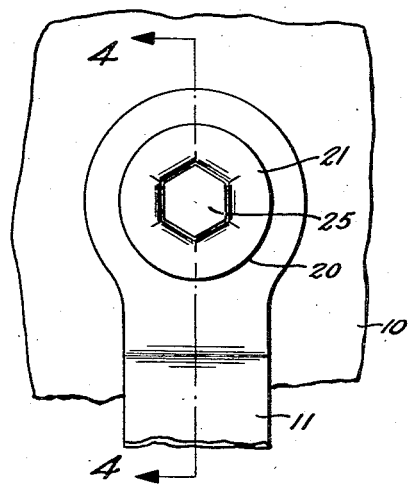
Fig. 1 is an end view of the connection of this invention and is taken looking to the right on Fig. 2.
Figure 2:
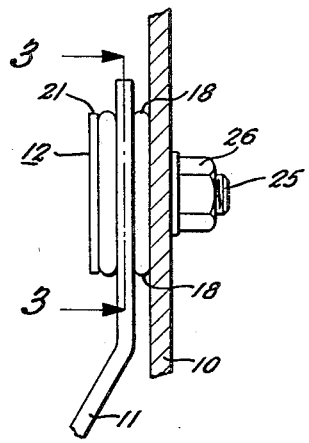
Fig. 2 is a side elevation of Fig. 1 and shows a section through the supporting plate.
Figure 3:
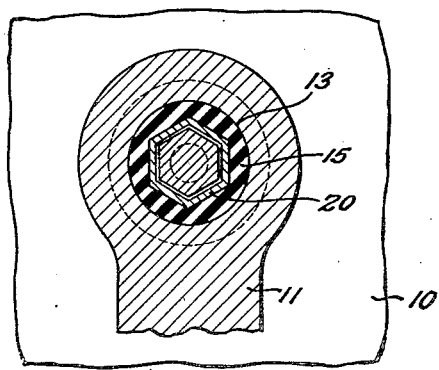
Fig. 3 is a section on line 3—3 of Figs. 2 and 4.

Reference numeral 10 designates a support base for the bracket 11 which is supported thereby through the vibration-absorbing yielding connection which is indicated as a whole by numeral 12. The support base 10 may be the chassis frame side rail of an automobile and the bracket 11 may support any of various devices on an automobile, for example the exhaust pipe and muffler, in such a way that sound and vibrations will not be transmitted through the connection 12.

Figure 4:
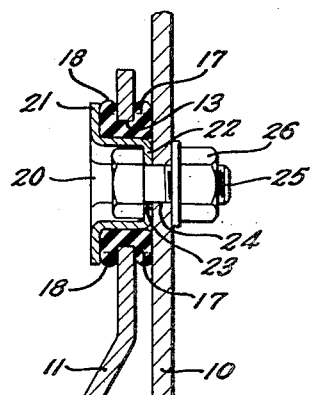
Fig. 4 is a section on line 4—4 of Fig. 1.

The bracket 11 may be a pressed sheet steel part having a hole 13 therein. The molded resilient bushing 15 is preferably molded to the shape shown in Fig. 5 of a high grade soft rubber. Bushing 15 is assembled in the hole 13 simply by pushing it into place, the yieldability of the small end flanges 16 thereon readily permitting its insertion into hole 13. Prior to being compressed bushing 15 fits snugly within hole 13 and its end flanges 16 terminate preferably approximately at the dotted lines 17 shown in Fig. 4.

A metal cup 20 having a flange 21 at one end is inserted snugly within the bushing 15. When bushing 15 is in its non-compressed state the cup 20 falls short of extending entirely through the bushing so that the bottom 22 of cup 20 is spaced a predetermined distance from the opposite end of the bushing 15 (see Fig. 5). It is thus seen that when bolt 25 is inserted through the hole 23 in the bottom 22 of cup 20 and hole 24 in the support 10 and the nut 26 screwed home that the bottom 22 will be drawn up against the support 10 and in the meantime the bushing 15 will be highly compressed between the flange 21 and support 10. This compression of bushing 15 will cause the resilient rubber to flow and bulge outwardly, as shown at 18, on both sides of the bracket 11. This outward bulging and tensioning of the rubber under its initial compression, as just described, prevents further outward flow of the rubber when the weight of the device supported by bracket 11 falls upon the connection 12. Also all the crevices about the rubber bushing 15 are tightly filled by the bulging rubber and hence prevent oil, mud, grit or other foreign matter from entering around the rubber and causing rapid deterioration thereof.

Figure 5:
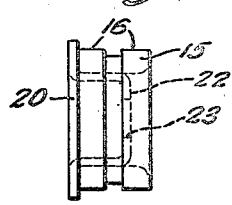
Fig. 5 is a detail view of the resilient non-metallic bushing as molded and with the metal cup inserted therein.

The precise desired degree of compression on the rubber is determined by the distance the cup bottom 22 falls short of being flush with the end of bushing 15 when in its non-compressed state as shown in Fig. 5. This distance of course is fixed when the parts are manufactured and hence the mechanic assembling the connection 12 to the parts 10 and 11 need give no attention to the degree of compression on the rubber but simply screws nut 26 home to clamp the bottom 22 of cup 20 up tight against the support base 10. The bracket 11 will then be yieldably supported in place by the connection 12 but be completely isolated from the support base 10 to substantially prevent all rattling and transmission of noises between these parts. If the bracket 11 supports the muffler of an automobile the resilient rubber 15 will prevent the muffler noises from being transmitted to the chassis side rail 10 and thence to the car body.

In the form illustrated the cup 20 is hexagon in cross section to prevent the head 24 of bolt 25 from turning but obviously cup 20 could be round in cross section if a slightly cheaper construction is desired.

It will be noted that the resilient connection 12 requires no special design of the parts 10 and 11 for its attachment thereto since these parts are plain flat plates at the point of attachment. It will also be noted that there two plates 10 and 11 can be retained by the isolating connection 12 very closely adjacent one another hence this connection 12 may be conveniently used for attaching the running boards and fenders of an automobile to the chassis frame. Of course many other uses will be readily apparent for such a simple form of isolating connection.

While the form of embodiment of the present invention as herein disclosed, constitutes a preferred form, it is to be understood that other forms might be adopted, all coming within the scope of the claims which follow.

What is claimed is as follows:

1. In combination, a support base, a member supported by said base by a yielding resilient connection, said connection comprising: a resilient non-metallic bushing inserted snugly through a hole in said member and projecting on each side thereof, a metal cup inserted within said bushing and having an outwardly extending flange extending beyond the edges of said hole in said member, said cup having a depth less than the axial length of said bushing when in non-compressed state, and means for clamping the bottom of said cup against said support base and thereby compress and outwardly distort said bushing substantially equally on both sides of said member between said cup flange and said base.

2. In combination, two members connected together by a resilient connecter, said connecter comprising: a soft rubber spool having end flanges inserted through a hole in one of said members, a metal cup inserted into said spool and having an outwardly extending marginal flange extending beyond the edges of said hole in said one member, said cup having a depth less than the axial length of said spool when in non-compressed state, and a bolt for drawing the bottom of said cup up against said other member and thereby axially compressing said soft rubber spool a predetermined amount, whereby the rubber end flanges of said spool are axially compressed substantially equally on both sides of said one member.

In testimony whereof I hereto affix my signature.

HARVEY D. GEYER.